US010850835B2

(12) United States Patent
Hutson (10) Patent No.: US 10,850,835 B2
(45) Date of Patent: Dec. 1, 2020

(54) UNMANNED AERIAL VEHICLE WITH MONOLITHIC WING AND TWIN-ROTOR PROPULSION/LIFT MODULES

(71) Applicant: QUALCOMM Incorporated, San Diego, CA (US)

(72) Inventor: Donald Hutson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 574 days.

(21) Appl. No.: 15/474,014

(22) Filed: Mar. 30, 2017

(65) Prior Publication Data

US 2018/0281941 A1    Oct. 4, 2018

(51) Int. Cl.
*B64C 29/00* (2006.01)
*B64C 39/02* (2006.01)
(Continued)

(52) U.S. Cl.
CPC ............ *B64C 29/0016* (2013.01); *B64C 5/02* (2013.01); *B64C 29/0033* (2013.01);
(Continued)

(58) Field of Classification Search
CPC ............ B64C 29/0016; B64C 29/0033; B64C 39/024; B64C 39/10; B64C 39/001;
(Continued)

(56) References Cited

U.S. PATENT DOCUMENTS 3,231,221 A * 1/1966 Platt ..................... B64C 29/0033
244/12.4
7,159,817 B2 * 1/2007 VanderMey ........ B64C 29/0016
244/12.1
(Continued)

FOREIGN PATENT DOCUMENTS

CN      103640690 A     3/2014
WO    2017040493 A1    3/2017

OTHER PUBLICATIONS

International Search Report and Written Opinion—PCT/US2018/019134—ISA/EPO—dated Apr. 20, 2018.

*Primary Examiner* — Richard R. Green
*Assistant Examiner* — Vicente Rodriguez
(74) *Attorney, Agent, or Firm* — Holland & Hart LLP (57) ABSTRACT

Various embodiments include a drone capable of operating as an airplane, a quad-copter, or a hybrid aircraft using a versatile flight performance envelope enabled by six elements of control. The drone may include a monolithic wing with a propulsion/lift module connected to each wing tip. Each propulsion/lift module may include a pivotal support structure configured to pivot around a longitudinal axis of the monolithic wing, with two pylons extending radially outwardly from the pivotal support structure and at least partially away from one another, and a propulsion units positioned on a distal end of each pylon. The pivotal support structures may be coupled to the monolithic wing via a servo motor enabling a processor to individually control rotation of each propulsion/lift module to provide roll and pitch control. Thrust and rotation of the propulsion units may be individually controlled by the processor to provide yaw, roll and pitch control.

24 Claims, 9 Drawing Sheets

(51) Int. Cl.
 *B64C 39/10* (2006.01)
 *B64C 5/02* (2006.01)
(52) U.S. Cl.
 CPC ............ *B64C 39/024* (2013.01); *B64C 39/10* (2013.01); *B64C 2201/104* (2013.01); *B64C 2201/108* (2013.01); *B64C 2201/128* (2013.01)
(58) Field of Classification Search
 CPC ................ B64C 5/02; B64C 2201/108; B64C 2201/104; B64C 2201/128
 See application file for complete search history.

(56) References Cited

U.S. PATENT DOCUMENTS

| | | | |
|---|---|---|---|
| 8,800,912 B2 | 8/2014 | Oliver | |
| 8,939,393 B2 | 1/2015 | Karem | |
| 9,493,235 B2 | 11/2016 | Zhou et al. | |
| 9,963,228 B2* | 5/2018 | McCullough | B64C 29/0033 |
| 2011/0001001 A1* | 1/2011 | Bryant | B64C 29/0033 |
| | | | 244/12.5 |
| 2011/0001020 A1 | 1/2011 | Forgac | |
| 2015/0175260 A1* | 6/2015 | Hesselbarth | B64C 29/0033 |
| | | | 244/7 A |
| 2016/0144957 A1* | 5/2016 | Claridge | B64C 29/02 |
| | | | 244/6 |
| 2016/0272312 A1 | 9/2016 | Mallard | |
| 2017/0217585 A1* | 8/2017 | Hulsman | B64C 39/024 |

* cited by examiner

UNMANNED AERIAL VEHICLE WITH MONOLITHIC WING AND TWIN-ROTOR PROPULSION/LIFT MODULES

BACKGROUND

Unmanned aerial vehicles (UAVs) or "drones" are being developed for many commercial applications that require new capabilities, greater safety and flexible takeoff and landing capabilities. Conventional aircraft platforms for drones are typically either a fixed wing airplane or a multi-rotor (e.g. quad-)copter. Each platform has strengths and weaknesses. For example, airplane wings are fuel efficient, and capable of greater lift and higher speeds compared to multi-rotor copter drones. However, multi-rotor copters can take-off, hover, and land vertically, providing advantages over airplane drones that require a runway and clear airspace for departing and approaching the runway. Airplanes can glide when power is lost but are not very safe or controllable at low airspeeds speeds and low altitudes. Quad-copters have excellent vertical takeoff and landing (VTOL) capabilities and maneuverability at low airspeeds and low altitudes, but have no safe mode when power is lost to the rotors.

SUMMARY

Various embodiments include a drone configured to operate as an airplane, a quad-copter, a tilt-rotor, or a hybrid aircraft in various flight modes enabled by a versatile flight performance envelope based on six elements of control. In various embodiments, the drone may include a monolithic wing having propulsion/lift modules coupled to each two wing tips with servo motors that enable the propulsion/lift modules to be independently rotated with respect to the wing surface. Each of the propulsion/lift modules may include a pivotal support structure coupled to a servo motor and configured to rotate around a longitudinal axis extending laterally across the monolithic wing, two pylons extending radially outwardly from the pivotal support structure and at least partially away from one another, and two propulsion units with one propulsion unit attached to a distal end of each pylon. In some embodiments, the two pylons may extend obliquely outward from each wing tip.

In some embodiments, the propulsion/lift modules may be configured to rotate into different rotational orientations with respect to the monolithic wing to enable the drone to operate in a flat-spin flight mode, in a wing flight mode, and in a vertical takeoff and landing (VTOL) flight mode. In some embodiments, the pivotal support structure includes a trailing edge, and in the VTOL flight mode, the propulsion/lift modules may be rotated with respect to the monolithic wing so that thrust from the propulsion/lift modules is directed approximately perpendicular to a lifting surface of the monolithic wing and the trailing edges of the pivotal support structure are positioned to provide a landing structure. In some embodiments, during a transition to or from the VTOL flight mode, the two propulsion units rotate through approximately 90 degrees, and wherein the monolithic wing is configured so that rotors of the propulsion units do not strike the monolithic wing. In some embodiments in the wing flight mode, the propulsion/lift modules may be rotated so that thrust from the propulsion/lift modules is directed approximately parallel to a lifting surface of the monolithic wing. In some embodiments in the flat-spin flight mode, the propulsion/lift modules may be rotated independently with respect to the monolithic wing into positions at which rotors generate yaw forces sufficient cause the drone to enter the flat-spin flight mode.

In some embodiments, the drone may further include a processor located in the monolithic wing, and a servo motor coupled to each pivotal support structure and to the processor. In some embodiments, the drone may further include an empennage connected to the monolithic wing. In some embodiments, the monolithic wing may be modular and configured to be replaced with another monolithic wing having a different flight characteristic. In some embodiments, the monolithic wing may include a cargo volume for holding a payload.

Some embodiments may include a propulsion/lift module that includes a pivotal support structure that may be configured to be coupled to a wing tip of a monolithic wing and configured to rotate relative to the monolithic wing, two pylons extending radially from two surfaces of the pivotal support structure and projecting obliquely outward from the wing tip, and two propulsion units in which one of the two propulsion units may be mounted to a distal end of each pylon. Some embodiments may further include two rotors with one rotor may be coupled to each propulsion unit.

Further embodiments include a method of operating an unmanned aerial vehicle (drone) as summarized above, in which the method may include rotating each propulsion/lift module independently, and controlling applied power independently to propulsion units according to a flight mode. In some embodiments, rotating each propulsion/lift module independently may include rotating the propulsion/lift modules independently with respect to the monolithic wing to enable the drone to operate in a flat-spin flight mode, in a wing flight mode, and in a vertical takeoff and landing (VTOL) flight mode. In some embodiments, rotating each propulsion/lift module independently may include rotating each pivotal support structure so that thrust from the propulsion/lift modules is directed approximately perpendicular to a lifting surface of the monolithic wing to place the drone in a vertical takeoff and landing (VTOL) flight mode. In some embodiments, rotating each propulsion/lift module independently may include transitioning to or from the VTOL flight mode to a wing flight mode by incrementally rotating each pivotal support structure through approximately 90 degrees. In some embodiments, rotating each propulsion/lift module independently may include operating the drone in the wing flight mode by rotating each pivotal support structure so that thrust from the propulsion/lift modules is directed approximately parallel to a lifting surface of the monolithic wing. In some embodiments, rotating each propulsion/lift module independently may include putting the drone into the flat-spin flight mode by rotating the propulsion/lift modules with respect to the monolithic wing into positions at which rotors generate yaw forces sufficient cause the drone to enter the flat-spin flight mode.

In some embodiments, rotating each propulsion/lift module independently and controlling applied power independently to propulsion units according to a flight mode may include controlling yaw, pitch and roll of the drone by individually controlling a rotation angle of each of the two propulsion/lift modules, and individually controlling power applied to each of the propulsion units. Some embodiments may further include controlling yaw and pitch attitude by increasing power to the propulsion units located on a first one of the two wing tips for yaw control, and increasing power simultaneously to either the top or bottom propulsion units at the two wing tips for pitch control. In some embodiments, rotating each propulsion/lift module independently may include controlling roll attitude by rotating the two propulsion/lift modules by equal but opposite angles above and below a lifting surface of the monolithic wing.

Some embodiments may include a drone with the structures summarized above and having means for performing functions of the methods summarized above

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a drone having a monolithic wing with a dual-rotor, independently-actuating propulsion/lift module on each of the two opposing wing tips. The monolithic wing or wing tips and each of the propulsion/lift modules may include a pivot axis and an actuator configured to pivot each propulsion/lift module around a longitudinal axis extending laterally across the monolithic wing, enabling the propulsion/lift modules to be rotated at least through 90 degrees and preferably through at least 180 degrees. So configured, the propulsion/lift module may provide lift when rotated so that thrust from the propulsion/lift module is directed approximately perpendicular to the lifting surface of the monolithic wing (i.e., the dual rotors are approximately parallel with the monolithic wing surface), provide propulsion when rotated so that thrust from the propulsion/lift module is directed approximately parallel to the lifting surface of the monolithic wing (i.e., the dual rotors are approximately perpendicular to the monolithic wing surface), and provide a mix of lift and propulsion when rotated to an intermediate orientation with respect to the monolithic wing surface. Each propulsion/lift module may include a pivotal support structure, also referred to herein as a "pitcheron nacelle," to which are coupled two pylons extending from the pitcheron nacelle/pivotal support structure obliquely outward away from the wing tip and at least partially away from one another, thus forming a V shape. A propulsion/lift module may be mounted to a distal end of each pylon. Each propulsion/lift module may generate thrust for either lift or propelling the drone forward. In various embodiments, the propulsion/lift module may generate thrust using a variety of thrust generating structures, including, for example, propeller ("rotors"), ducted fans (which include rotors), turbofans, and jet engines. In some embodiments employing rotors, the propulsion unit may include a motor configured to drive (i.e., rotate) a fixed-pitch rotor to provide the necessary lift for hovering flight or thrust for sustained fixed-wing flight. Each of the propulsion units (at least four in total) may be coupled to a controller and independently powered and controlled so that the rotation speed of each rotor can be independently adjusted to achieve attitude control while in flight.

The drone according to various embodiments may be controlled in flight by independently rotating the rotatable propulsion/lift modules and independently controlling the rotor speed of each of the four propulsion units. Thus, the drone may operate as an airplane, a quad-copter, a tilt-rotor, or a hybrid aircraft in various flight modes because of the versatile flight performance envelope enabled by the six elements of control provided by the dual-rotor, independently-actuating propulsion/lift modules. For example, the drone may operate as a vertical take-off and landing (VTOL aircraft) by rotating the propulsion/lift modules perpendicular to the surface of the monolithic wing, thereby directing the downwash of air vertically downward to lift the drone above the ground and clear of nearby obstacles. The drone may transition from a VTOL flight mode by rotating the propulsion/lift modules toward the leading edge of the monolithic wing, thereby thrusting the drone forward to increase relative airspeed across the wing. The drone may transition to full wing flight mode when the drone has achieved sufficient airspeed and the propulsion/lift modules are rotated so that the rotors are approximately perpendicular to the wing surface (referred to herein as a neutral position). The wing flight mode takes full advantage of the benefits of the monolithic wing which may include improved lift and speed for improved fuel efficiency, range, and transit time. The versatile flight performance envelope provided by independently rotating the rotatable propulsion/lift modules may enable the drone to enter a flat-spin flight mode. Should the drone experience a loss of power, the rotatable propulsion/lift modules may be rotated differentially in order to put the drone into a flat-spin, a special category of stall resulting in autorotation about the drone's major axis in a shallow, rotating, downward path, enabling the drone to safely land after the loss of power.

As used herein, the term "drone" refers unmanned aerial vehicles according to various embodiments. A drone may include an onboard computing device configured to fly and/or operate the drone without remote operating instructions (i.e., autonomously), such as from a human operator or remote computing device. Alternatively, the onboard computing device may be configured to fly and/or operate the drone with some remote operating instruction or updates to instructions stored in a memory of the onboard computing device.

The term "monolithic wing" is used herein to refer to a wing formed or composed of material without joints or seams constituting an undifferentiated and often rigid whole as described herein.

Figure 1:
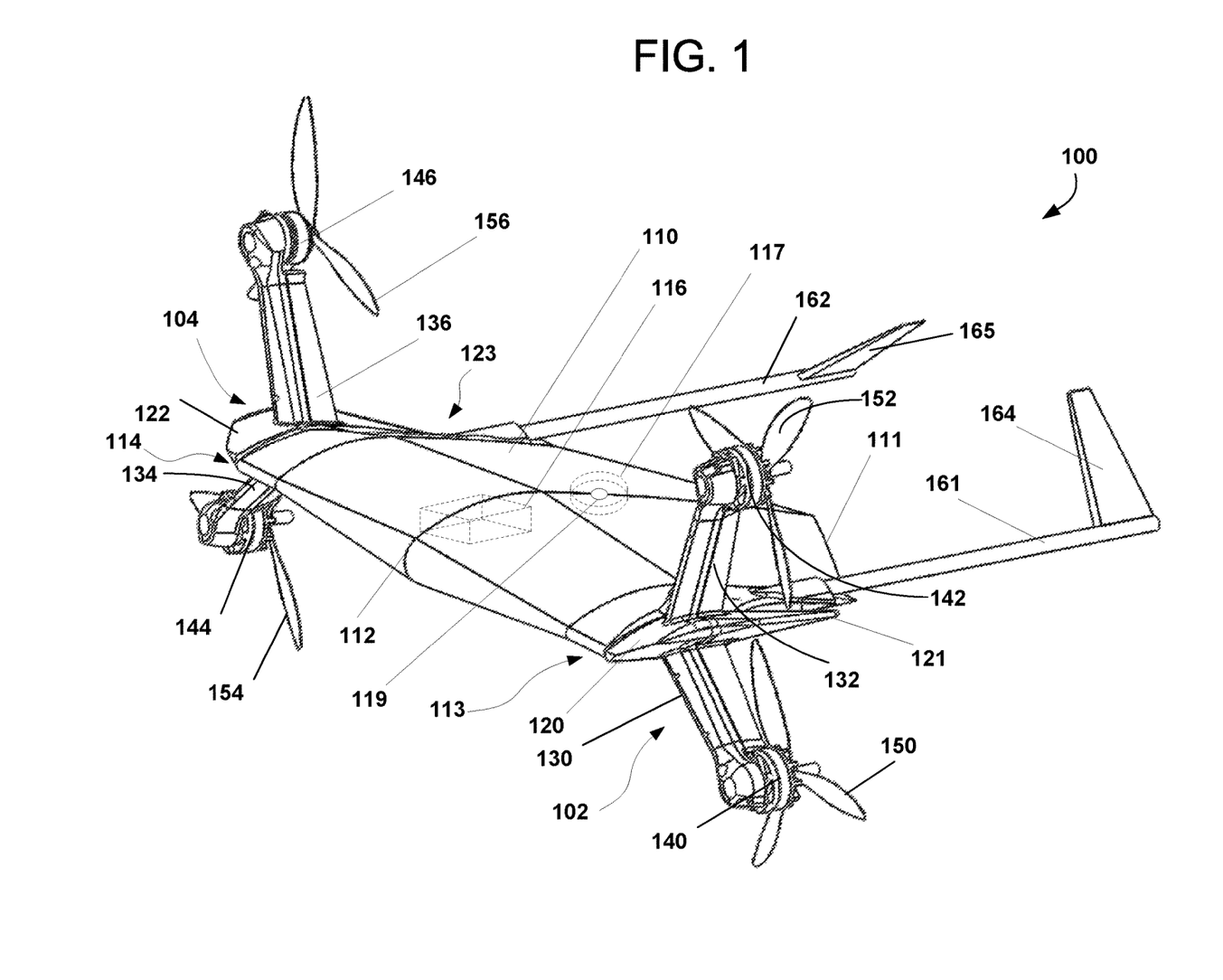
FIG. 1 is a perspective view of a drone with a monolithic wing and V-shaped power modules configured for wing flight mode according to various embodiments.
Figure 2:
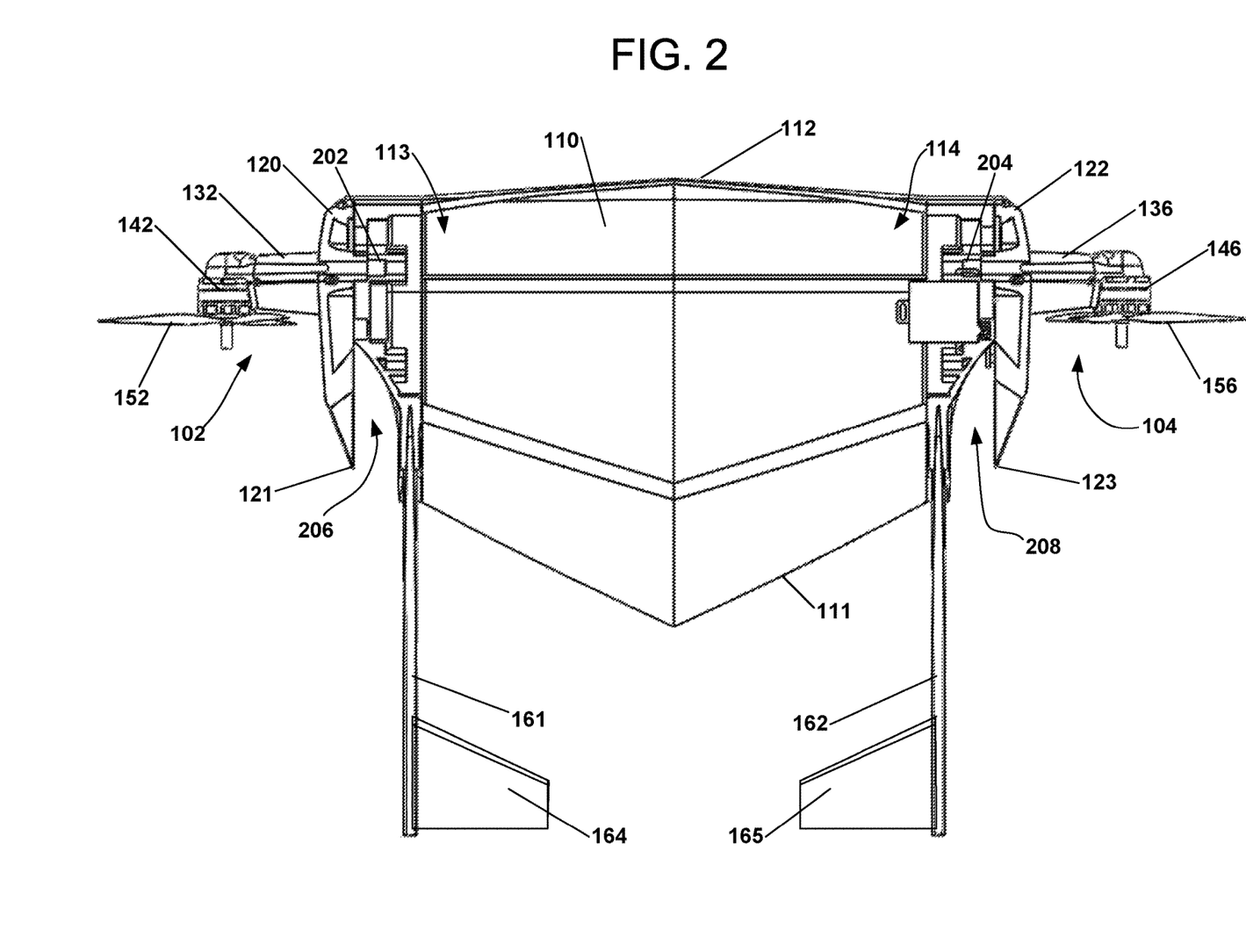
FIG. 2 is a top view of the drone configured for the wing flight mode according to various embodiments.

FIGS. 1 and 2 illustrate a drone 100 with the propulsion/lift modules 102, 104 rotated for wing flight mode according to various embodiments. Referring to FIGS. 1 and 2, a drone 100 may include a monolithic wing 110 having a leading edge 112, a trailing edge 111, and two wing tips 113, 114 located at the ends of the monolithic wing 110. The monolithic wing 110 may be connected to passive (i.e., having no operable flight control surfaces) empennages 164, 165 by booms 161, 162. The empennages 164, 165 may provide for better stability in wing flight mode.

Each wing tip 113, 114 may be connected to a propulsion/lift module 102, 104 by a servo motor 202, 204. The term "propulsion/lift module" is used herein to refer to various embodiments of an assembly of components that is configured to receive control inputs for the direction and application of power to each propulsion unit in a coordinated manner to maintain flight stability in every flight mode. Each servo motor 202, 204 may be coupled to a pivotal support structure 120, 122 and configured so that each propulsion/lift module 102, 104 may be independently rotated by a control unit 117 with respect to the lifting surface of the monolithic wing 110.

The pivotal support structure 120, 122 of each propulsion/lift module 102, 104 is also referred to herein as a "pitcheron nacelle" because the structure may be a streamlined housing (a nacelle) that is configured to be rotated for pitch control (similar to a pitcheron). In particular, the pitcheron nacelle/pivotal support structure 120, 122 may house a servo motor 202, 204 coupled to the wing tip 113, 114, or may be coupled to a servo motor 202, 204 that is positioned within the wing tip 113, 114. Each servo motor 202, 204 may be configured to control the rotation of the pitcheron nacelle/pivotal support structure 120, 122 with respect to the lifting surface of the monolithic wing 110. The servo motor 202, 204 within or coupled to each pitcheron nacelle/pivotal support structure 120, 122 may be independently controlled so the two pitcheron nacelles/pivotal support structure 120, 122 can be rotated with respect to the lifting surface of the wing independently of one another, enabling independent control of the thrust vector of the propulsion/lift modules 102, 104. To achieve various flight modes, the propulsion/lift modules 102, 104 may be rotated independently or synchronously. Each pitcheron nacelle/pivotal support structure 120, 122 may have a nose and a trailing edge 121, 123.

Each pitcheron nacelle/pivotal support structure 120, 122 may be connected to two pylons 130, 132, 134, 136 that extend at least partially away from one another and obliquely outward from each wing tip 113, 114. One propulsion unit 140, 142, 144, 146 may be mounted at the distal end of each pylon. In various embodiments, the propulsion/lift module may generate thrust using a variety of thrust generating structures, including, for example, propeller ("rotors"), ducted fans (which include rotors), turbofans, and jet engines. In some embodiments employing rotors. For ease of description, various embodiments are illustrated in the figures using the example of the propulsion units driving a fixed-pitch rotor 150, 152, 154, 156 to provide lift and/or thrust for various flight modes. However, the references to fixed-pitch rotors 150, 152, 154, 156 in the figures and the following descriptions are not intended to limit the scope of the claims unless rotors are specifically recited in the claims.

As illustrated in FIGS. 1 and 2, in the wing flight mode both propulsion/lift modules 102, 104 may be oriented with their pitcheron nacelles/pivotal support structure 120, 122 nose forward (i.e., in the neutral position with the rotors approximately perpendicular to the wing surface) so the that thrust from the propulsion/lift modules 102, 104 is directed approximately parallel to the lifting surface of the monolithic wing 110. In embodiments in which the propulsion/lift modules 102, 104 are propeller driven, the rotors 150, 152, 154, 156 may be approximately perpendicular to the wing 110 surface in the wing flight mode. In this configuration, the propulsion/lift modules 102, 104 provide thrust to drive the drone 100 forward during flight, and the monolithic wing 110 provides lift to maintain the drone 100 in the air. The wing flight mode enables airplane like performance and flight characteristics.

The propulsion/lift modules 102, 104 may be configured to be modular and configured to be easily connected to or disconnected from the wing tips 113, 114 of the monolithic 110 enabling easy replacement. This may enable propulsion/lift modules 102, 104 with different flight performance characteristics to be used on the drone 100. For example, the propulsion/lift modules 102, 104 may have different rated propulsion units, rotor sizes, and lengths of the pitcheron nacelles/pivotal support structure 120, 122 and pylons 130, 132, 134, 136.

The monolithic wing 110 may be configured to be modular and replaceable by other monolithic wings having different flight performance characteristics. For example, monolithic wings 110 may be configured to have different lengths, aspect ratios, camber, wing loading, and dihedral angle. These dimensions may combine to create different flight performance characteristics for the monolithic wing 110. Monolithic wings 110 may be made of different and composite materials, including for example, a solid foam core interior, a balsa-wood frame with a fabric skin on the outside, fiberglass, and other composite materials. The monolithic wing 110 may be configured to contain or include a cargo volume 116 inside a portion of the monolithic wing 110 or attached below the monolithic wing 110 and configured for holding a payload (e.g., a camera or other sensor) and/or the transport and delivery of various objects.

The monolithic wing 110 may house a control unit 117 including a processor 119 configured to control the motors 140, 142, 144, 146 and the servo motors 202, 204. The processor 119 may send control signals to the servo motors 202, 204 and propulsion units 140, 142, 144, 146. The control signals sent from the processor to the servo motors 202, 204 control the direction and speed of rotation of the propulsion/lift modules 102, 104, while the control signals sent from the processor to the propulsion units 140, 142, 144, 146 control the direction and speed of the rotors 150, 152, 154, 156 coupled to the propulsion units.

The top view of the drone 100 shown in FIG. 2 illustrates that the monolithic wing 110 may be configured so that the outer circumferences of the rotors 152, 156 do not interfere with the monolithic wing 110 when the propulsion/lift modules 102, 104 are rotated through various angles of rotation by the servo motors 202, 204, such as while transitioning to or from the VTOL flight mode. For example, the monolithic wing 110 may include wing tapers 206, 208 that provide space for the top rotors 152, 156, thereby enabling the top rotors 152, 156 to avoid striking the monolithic wing 110 when rotating from the wing flight mode configuration to other flight mode configurations.

For ease of description and illustration, some detailed aspects of the drone 100 are admitted such as wiring, internal frame structure interconnects and other features that would be known to one of skill in the art. For example, the wiring that couples the control unit 117 and processor 119 to each servo motor 202, 204 and the four propulsion units 140, 142, 144, 146 is omitted for clarity. Such control wiring from the processor 119 may run through the monolithic wing 110 to an electrical connector (not shown) near the servo motors 202, 204, and separately to another electrical connector (not shown) near the pitcheron nacelles/pivotal support structure 120, 122 and continuing through the pylons 130, 132, 134, 136 to the propulsion units 140, 142, 144, 146.

The wing flight mode configuration shown in FIG. 1 has both propulsion/lift modules 102, 104 oriented in the neutral position (i.e., with the rotors approximately perpendicular to the wing surface). The independently rotatable propulsion/lift modules 102, 104 and the individually controlled four propulsion units 140, 142, 144, 146 provides advantages in yaw, pitch, and roll flight controls compared to conventional drones in the wing flight mode. For example, yaw control of the drone 100 may be accomplished by providing differential power to the propulsion units 140, 142 of propulsion/lift module 102 compared to the power applied to the propulsion units 144, 146 of propulsion/lift module 104. Course pitch control may also be accomplished by rotating the both propulsion/lift modules 102, 104. Also, fine pitch control may be accomplished by providing differential power to propulsion units 140, 144 over the power to propulsion units 142, 146, or vice versa. Course roll control may be accomplished by rotating the propulsion/lift modules 102 in opposite directions, thereby directing thrust upward on one wing tip 113 and downward on the other wingtip 114. Fine roll control may be accomplished by applying differential power to the propulsion units 140, 142 of propulsion/lift module 102 compared to the power applied to the propulsion units 144, 146 of propulsion/lift module 104. Thus, the ability to independently control the rotation/orientation of the propulsion/lift modules 102, 104 and independently control the speed of each rotor 150, 152, 154, 156 may be used by the control unit 117 to provide combinations of flight control forces that may improve attitude control and maneuverability of the drone 100 through a broad range of flight speeds and flight modes.

The empennage 164, 165 may be connected to the monolithic wing 110 by booms 161, 162 to provide added stability in wing flight mode. The empennage 164, 165 may be passive and modular with other empennages having different flight performance characteristics. In some embodiments, the empennages may include active flight control surfaces (not shown), such as stabilators, elevators, rudders, and trim tabs.

Figure 3:
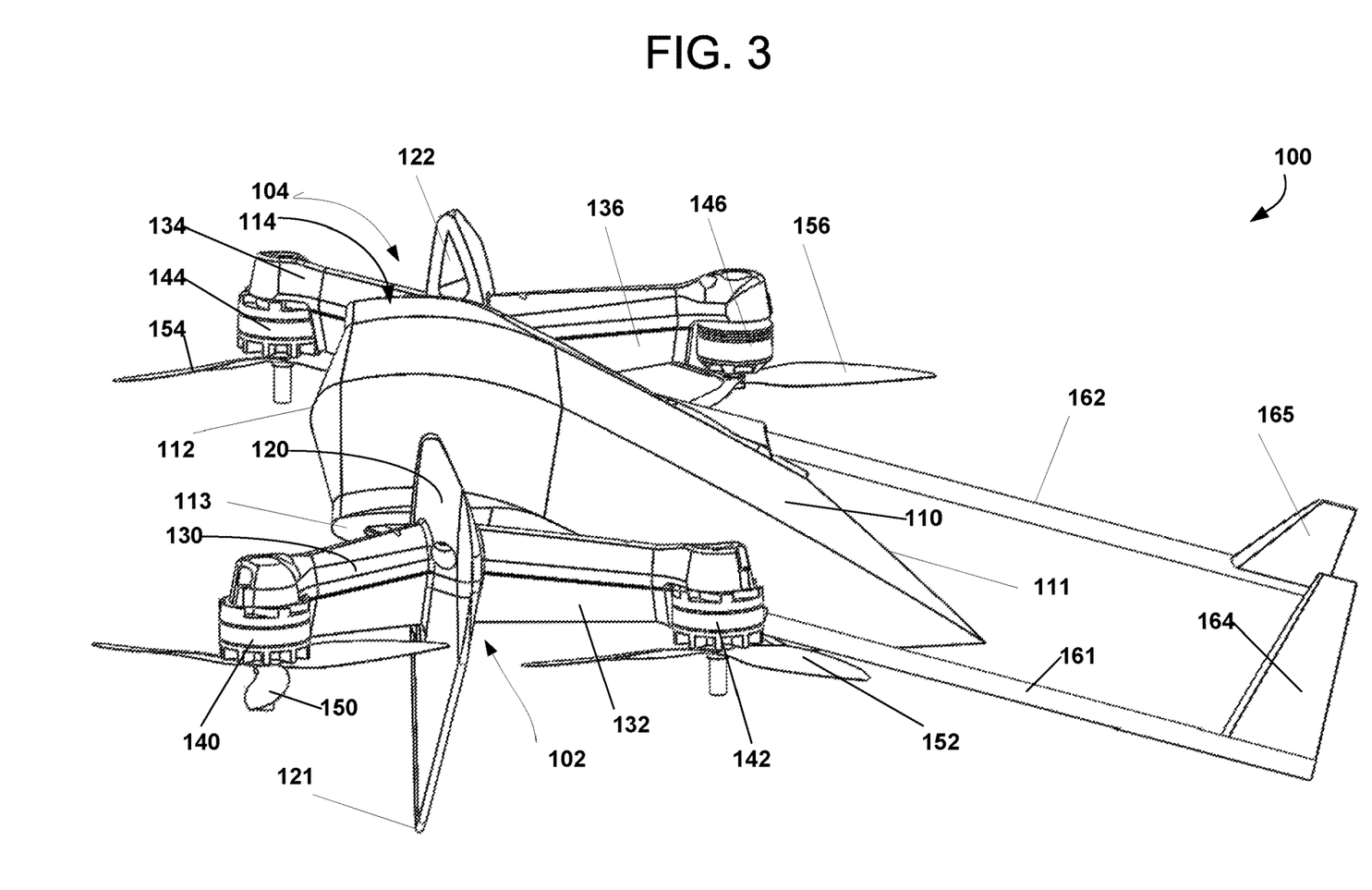
FIG. 3 is a perspective view of the drone in FIG. 1 configured for VTOL flight mode according to various embodiments.
Figure 4:
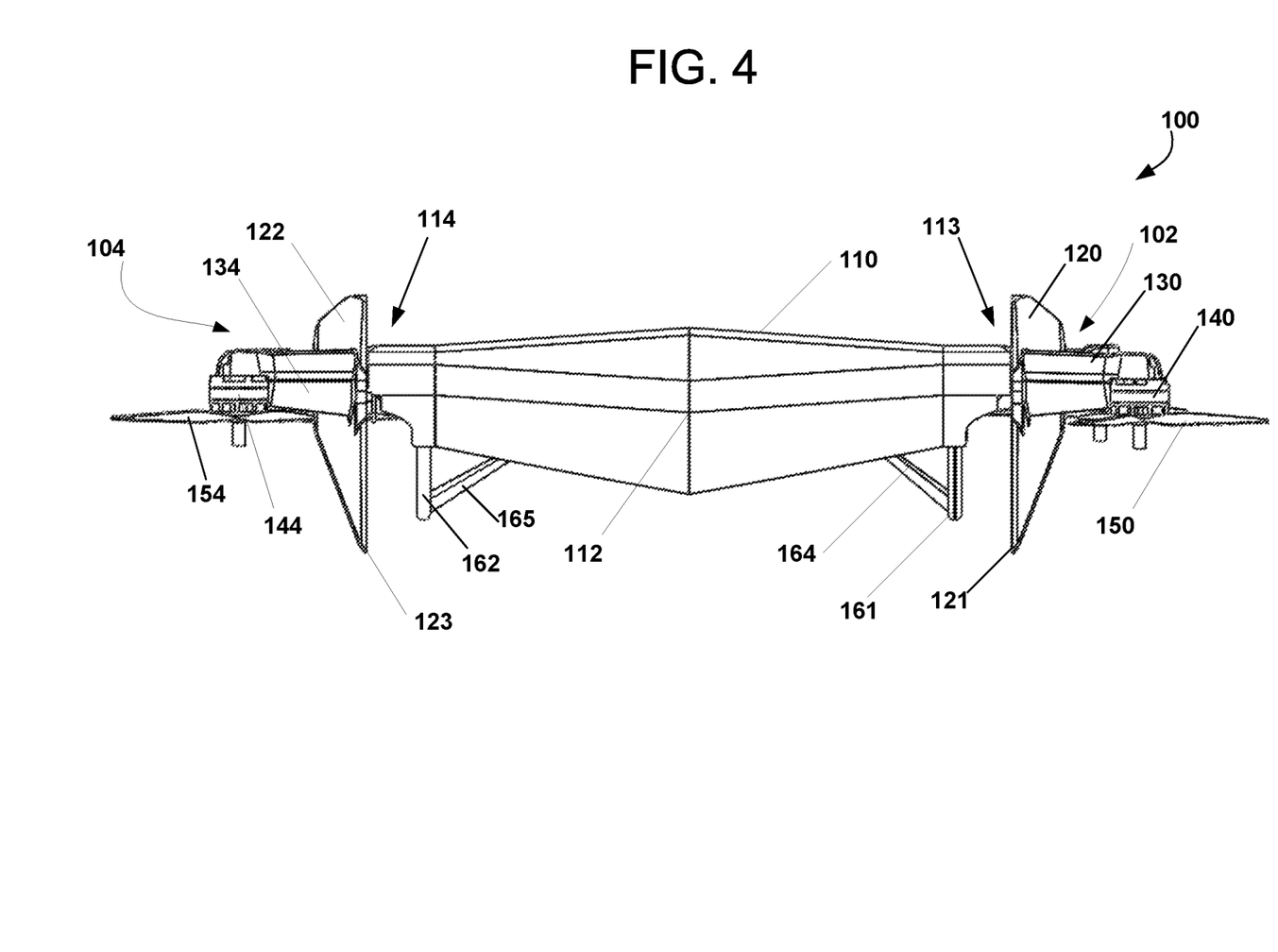
FIG. 4 is a front view of the drone configured for the VTOL flight mode according to various embodiments.

FIGS. 3 and 4 illustrate the drone 100 with the propulsion/lift modules 102, 104 rotated so that thrust from the propulsion/lift modules is directed approximately perpendicular to the lifting surface of the monolithic wing (e.g., approximately 90° aft of the neutral position) suitable for the VTOL flight mode. With reference to FIGS. 1-4, in the VTOL flight mode the propulsion/lift modules 102, 104 are oriented to direct the combined downwash of the rotors 150, 152, 154, 156 downward for vertical take-off, hover, or landing. Thus, in the VTOL flight mode the propulsion/lift modules 102, 104 are rotated so that the rotors 150, 152, 154, 156 are approximately parallel to the lifting surface of the monolithic wing 110. In the VTOL flight mode, the lifting forces are provided by the thrust of the propulsion/lift modules 102, 104 (e.g., the downwash of the rotors 150, 152, 154, 156), and monolithic wing 110 may provide little to no lift. In the VTOL flight mode, the control unit 117 may maintain attitude control by individually controlling the power applied to each propulsion units 140, 142, 144, 146, thereby adjusting the rotation speed of each rotor 150, 152, 154, 156 in a manner similar to how a quadcopter drone is controlled. In addition to using quadcopter-type flight control techniques, the control unit 117 may control the servo motors 202, 204 to rotate the propulsion/lift modules 102, 104 to cause the drone to move forward (such as to pick up speed to transition to the wing flight mode) or backwards.

As illustrated in FIG. 4, when the propulsion/lift modules 102, 104 are rotated so that the thrust is directed downward (i.e., approximately perpendicular to the lifting surface of the monolithic wing) for the VTOL flight mode (90° aft of the neutral position), the trailing edges 121, 123 of the pitcheron nacelles/pivotal support structure 120, 122 may function in conjunction with the booms 161, 162 of the empennages 164, 165 as landing structures for the drone 100.

Figure 5:
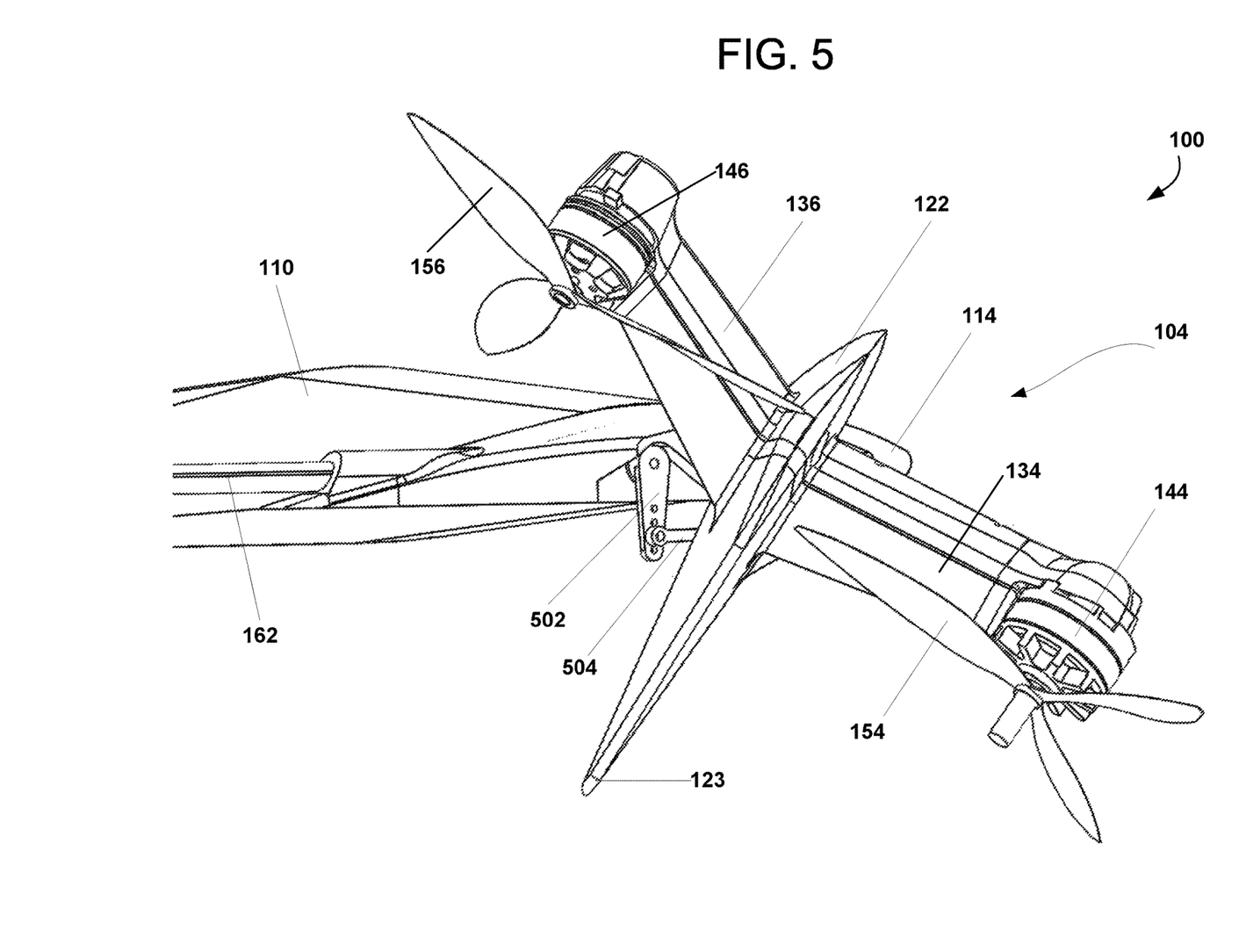
FIG. 5 is a right side view of the drone in FIG. 1 with a twin-rotor propulsion/lift module rotated for a transition flight mode according to various embodiments.

FIG. 5 illustrates the drone 100 with a propulsion/lift module 104 rotated for a transitionary flight mode configuration. With reference to FIGS. 1-5, the drone 100 may transition from the VTOL flight mode to the wing flight mode by the controller unit 117 commanding the servo motors 202, 204 to rotate the propulsion/lift modules 102, 104 so that the rotors 150, 152, 154, 156 provide both lift and thrust to accelerate the drone 100 towards flight speed. Thus, rotating the propulsion/lift modules 102, 104 so that the thrust is directed partially down (i.e., with a vector component approximately perpendicular to the lifting surface of the monolithic wing) and partially aft (i.e., with a vector component approximately parallel to the lifting surface of the monolithic wing), To transition from the wing flight mode to the VTOL flight mode, the controller unit 117 may command the servo motors 202, 204 to rotate the propulsion/lift modules 102, 104 so that the rotors 150, 152, 154, 156 incrementally provide less forward thrust (causing the drone 100 to slow) and more lift (i.e., downward thrust) to compensate for the loss of lift by the wing 110 as airspeed decreases. While FIG. 5 illustrates the propulsion/lift modules 102, 104 oriented at approximately 45° aft of the neutral position, the transition from VTOL flight mode to the wing flight mode and vice versa may be accomplished by rotating the propulsion/lift modules 102, 104 slowly or incrementally between 0° and 90° and vice versa.

FIG. 5 also shows an example of a servo motor actuator arm 502 extending from the servo motor 202, 204 located in the monolithic wing's right wing tip 114, which is connected to a linkage 504 that is coupled to the pitcheron nacelle/pivotal support structure 122. Alternatively, the servo motor 202, 204 and the servo motor arm 502 may be located inside the pitcheron nacelle/pivotal support structure 122, and connected to the linkage 504 that is coupled to the monolithic wing 110 to enable rotation of the propulsion/lift module 104 with respect to the monolithic wing 110.

Figure 6A:
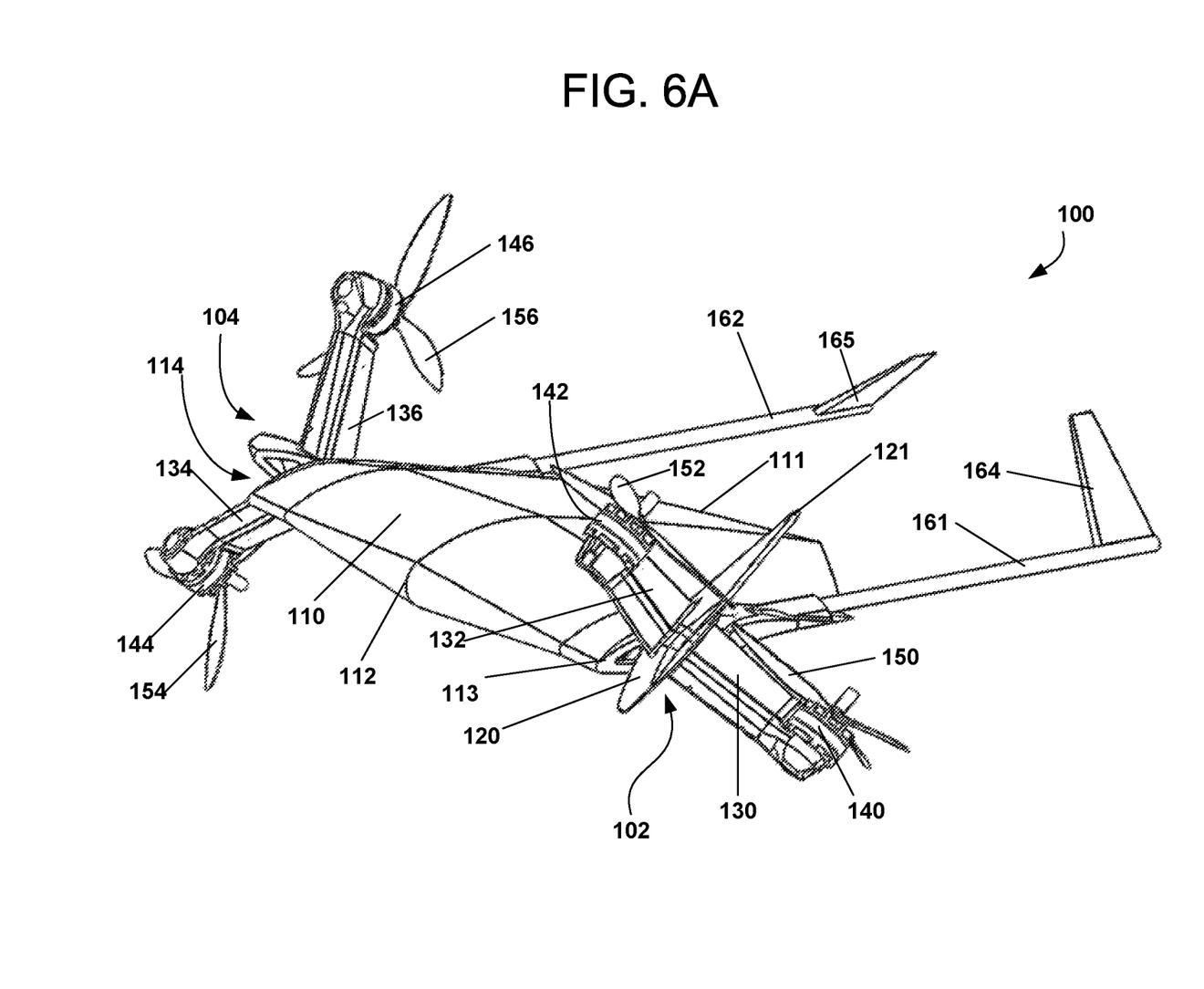
FIGS. 6A and 6B are perspective views of a drone configured for flat-spin flight mode according to various embodiments.
Figure 6B:
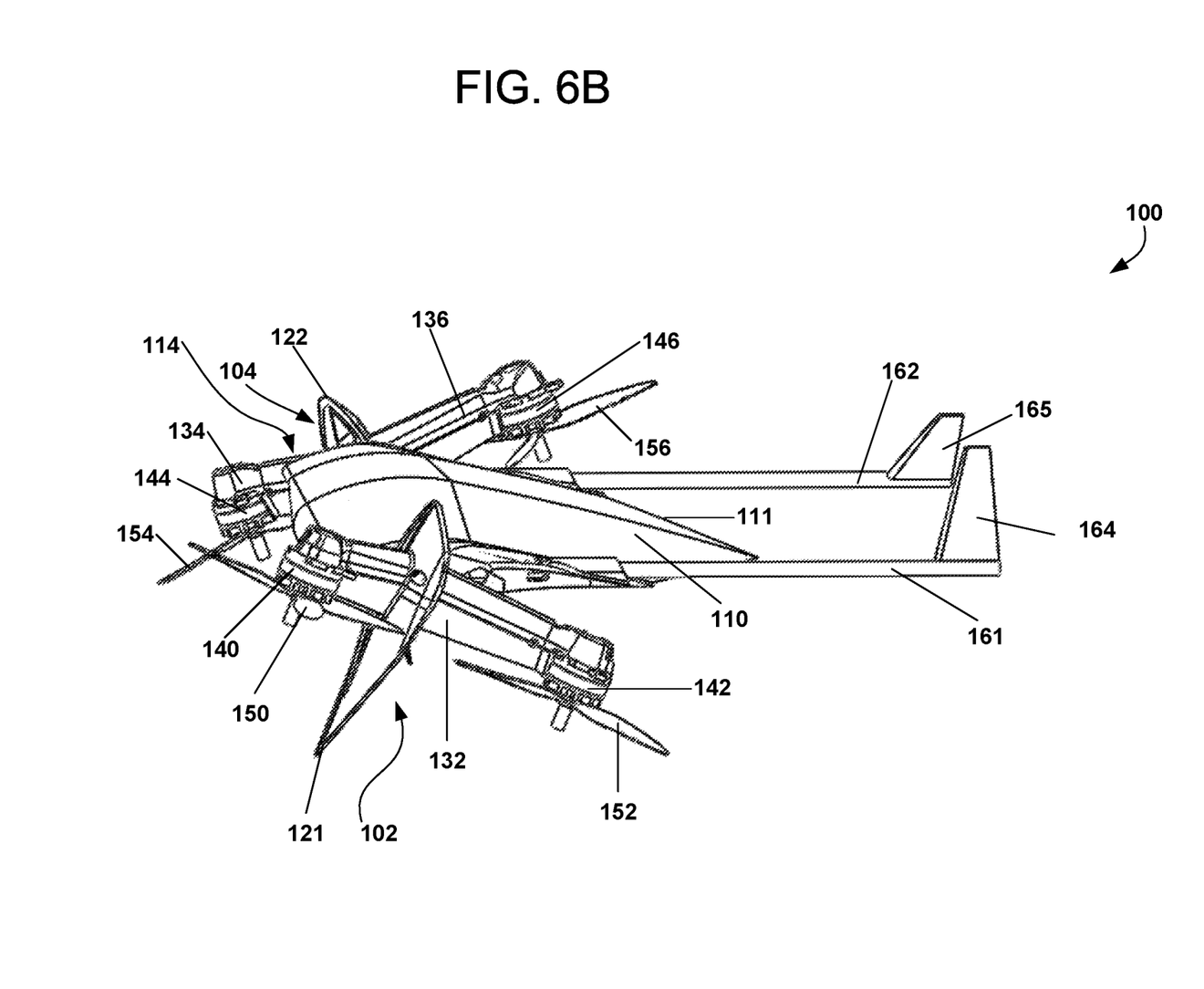

FIGS. 6A and 6B illustrate the drone 100 with the propulsion/lift modules 102, 104 rotated in alternative configurations that may induce a flat spin for emergency landing according to some embodiments. With reference to FIGS. 1-6B, rotating the two propulsion/lift modules 102, 104 in opposite directions may cause the rotors (e.g., due to autorotation) to generate yaw forces that may induce the drone 100 to enter the flat-spin flight mode. A flat-spin is a special category of stall resulting in autorotation about the drone's vertical axis in a shallow, rotating, downward path. For example, by rotating the two propulsion/lift modules 102, 104 approximately 30° forward and approximately 30° aft of the neutral position, respectively, as illustrated in FIG. 6A, the drag induced by the rotors 150, 152, 154, 156 may generate yaw forces sufficient cause the drone 100 to enter the flat-spin flight mode. In another example illustrated in FIG. 6B, by rotating the two propulsion/lift modules 102, 104 upward (i.e., into hover mode) to approximately 20° and 340°, respectively, with 360° being straight up, the thrust and drag of the rotors 150, 152, 154, 156 may generate yaw forces sufficient cause the drone 100 to enter the flat-spin flight mode. By controlling the angle of rotation of the two propulsion/lift modules 102, 104, the control unit 117 may control the rate of rotation in the flat-spin flight mode, which may control the rate of descent. Thus, the control unit 117 may control the drone 100 in the flat-spin flight mode so that the drone 100 descends slowly enough to land safely.

Figure 7:
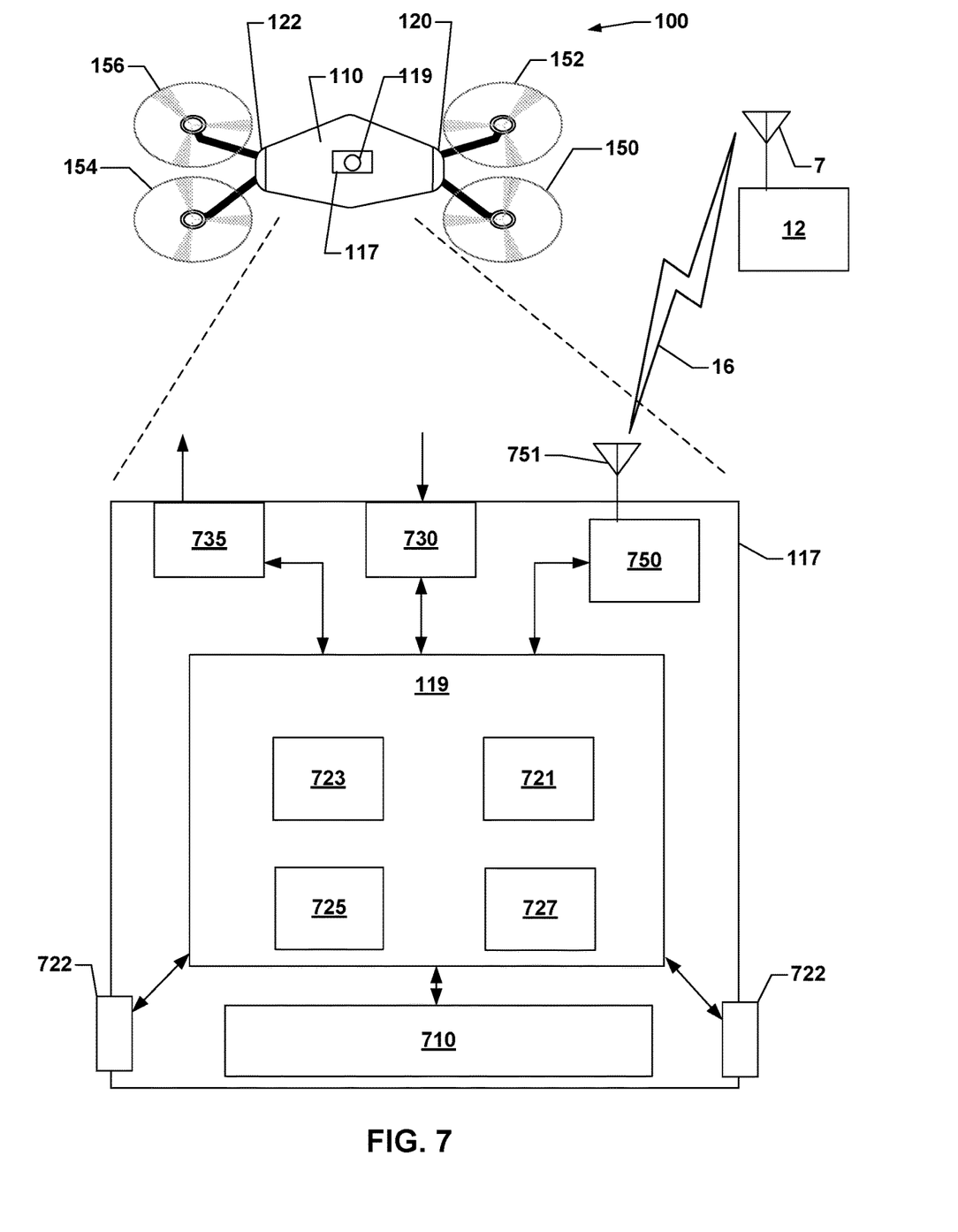
FIG. 7 is a component block diagram of a drone including command-and-control components suitable for use with various embodiments.

FIG. 7 illustrates components of a drone 100 suitable implement various embodiments. With reference to FIGS. 1-7, the drone 100 may include a control unit 117 embedded in the monolithic wing 110 that may house various circuits and devices used to power and control the operations of the drone 100. The control unit 117 may include the processor 119, a power module 710, an input module 730, sensor(s) 722, an output module 735, and a radio module 750 coupled to an antenna 751. The processor 119 may include or be coupled to memory 721 and a navigation unit 723. The processor 119 may be coupled to an output module 735, which may output control signals for controlling the individual propulsion units 140, 142, 144, 146 that drive the rotors 150, 152, 154, 156. The processor 119 may be configured with processor-executable instructions to use the output module 735 to actuate the servo motors 202, 204 and control the power applied to the individual propulsion units 140, 142, 144, 146 to affect flight controls and other operations of the drone 100, including operations of the various embodiments.

The power module 710 may include one or more batteries (e.g., rechargeable batteries) that may provide power to various components, including the processor 119, the input module 730, the sensor(s) 722, the output module 735, and the radio module 750.

Through control of the rotational orientation of the propulsion/lift modules 102, 104 and control of individual propulsion units 140, 142, 144, 146, and thus the speed of the rotors 150, 152, 154, 156, the control unit 117 may control the flight of the drone 100. The processor 119 may receive data from the navigation unit 723 and use such data to determine the present position, altitude, speed and direction, and orientation of the drone 100, as well as the appropriate course towards a destination. In various embodiments, the navigation unit 723 may include a global navigation satellite system (GNSS) receiver system (e.g., a Global Positioning System (GPS) receiver) enabling the drone 100 to determine its location and velocity using GNSS signals received from three or more GNSS satellites (e.g., GPS satellites). Alternatively or in addition, the navigation unit 723 may be equipped with radio navigation receivers for receiving navigation beacon (e.g., very high frequency (VHF) Omni Directional Radio Range (VOR) beacons), GPS error/bias broadcasts or other signals from radio nodes, Wi-Fi access points, cellular network sites, radio stations, remote computing devices, other drones, etc.

The processor 119 and/or the navigation unit 723 may be configured to communicate with a server through a wireless connection (e.g., a cellular data network) to receive commands useful in navigation, provide real-time position altitude reports, and assess data. An avionics module 727 may be coupled to a gyro/accelerometer unit 725, the processor 119 and/or the navigation unit 723. The avionics module 727 may be configured to provide the processor 119 with flight control-related information such as altitude, rotation rates and accelerations (e.g., pitch, roll and yaw), attitude, airspeed, heading and similar information that the processor 119 may use to determine how to control the propulsion/lift modules 102, 104 and individual propulsion units 140, 142, 144, 146 to achieve stable flight. Information from the avionics module 727 may also be used by the navigation unit 723 for navigation purposes, such as dead reckoning between GNSS position updates.

The radio module 750 may be configured to receive signals via the antenna 751, such as command signals to perform various flight maneuvers, receive signals from aviation navigation facilities, etc., and provide such signals to the processor 119 and/or the navigation unit 723 to assist in operation of the drone 100. In some embodiments, commands for navigating the drone 100, or components thereof may be received via the radio module 750. In some embodiments, the drone 100 may receive commands from a control device 12 via uplink signals 16 sent, via an antenna 7, and send data to the control device 12 via downlink signals 16.

In various embodiments, the control unit 117 may be equipped with the input module 730, which may be used for a variety of applications. For example, the input module 730 may receive and pre-process images or data from an onboard component, such as sensor(s), or may receive electronic signals from other components (e.g., a payload).

Utilizing sensor data (e.g., speed, orientation and acceleration) available from onboard components, the control unit 117 using the processor 119 may determine the current flight regime of the drone 100. That is, whether the drone 100 is in wing flight mode, VTOL flight mode, flat-spin flight mode, or a transition flight mode. In particular, the processor 119 may consider inputs from the avionics module 727, such as altitude, attitude, airspeed, heading, aircraft settings, and similar information that the navigation unit 723, along with data from the gyro/accelerometer unit 725 to determine the drone position and the particular flight regime the drone 100 is currently in and converting towards. Based on such determinations, the processor 119 may control the individual propulsion units 140, 142, 144, 146 that drive the rotors 150, 152, 154, 156 (e.g., via the output module 735) to maintain stable flight.

While the various components of the control unit 117 are illustrated in FIG. 7 as separate components, some or all of the components (e.g., the processor 119, the output module 735, the radio module 750, and other units) may be integrated together in a single device or module, such as a system-on-chip (SoC).

For ease of description and illustration, some detailed aspects of the drone 100 are omitted, such as wiring, connectors, frame structure, power source, landing columns/gear, or other features that would be known to one of skill in the art. In addition, the drone 100 may have similar or different configurations, numbers of rotors, and/or other aspects.

Figure 8:
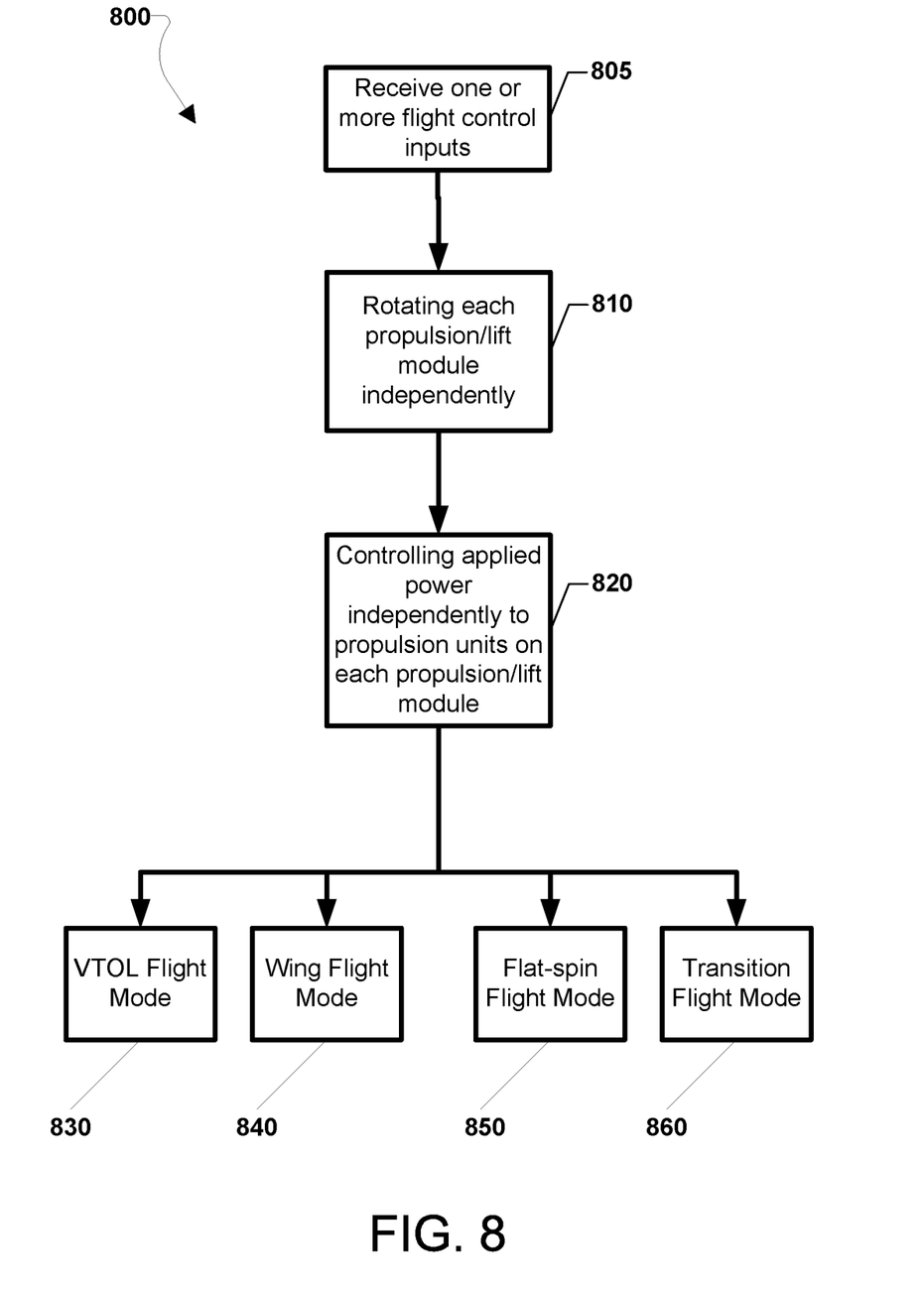
FIG. 8 is a process flow diagram illustrating a method of operating a drone according to various embodiments.

FIG. 8 illustrates a method 800 of operating a drone with a propulsion/lift module 102, 104 according to various embodiments. With reference to FIGS. 1-8, operations of the method 800 may be performed by the control unit 117 or other computing device (e.g., wireless communication devices or a server) associated with the drone 100.

In block 805, the processor of the drone may receive one or more flight control inputs. The one or more flight control inputs may be received, for example, from an input module. The one or more flight control inputs may include a destination (e.g., from an operator), position information, attitude information (e.g., pitch, roll, yaw) from an avionics module (e.g., 727), accelerations and rotational information from accelerometers and gyroscopes, and the like. The flight control input may be received before the drone takes flight, during a flight from one location to another, after landing but before a subsequent flight, or other suitable time.

In block 810, the processor may respond to the flight control inputs by rotating each propulsion/lift module independently to rotational positions at which the rotors generate forces in opposite directions that may induce yaw forces sufficient to cause the drone to enter and remain in a flat spin. For example, the processor may rotate the two propulsion/lift modules 102, 104 to approximately 30° forward and approximately 30° aft of the neutral position, respectively. As another example, the processor may rotate the two propulsion/lift modules 102, 104 upward (i.e., into hover mode) to approximately 20° and 340°, respectively, with 360° being straight up.

In block 820, the processor may also respond to the flight control inputs by controlling the applied power to each rotor independently.

The combination of independent control of the propulsion/lift module rotation in block 810 and independent control of applied power to each rotor block 820 and provides for the various flight modes above. In particular, the VTOL flight mode in block 830, the wing flight mode in block 840, the flat-spin mode in block 850, and the transition flight mode in block 860 as described.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:
1. An aerial drone, comprising:
a monolithic wing having two wing tips; and
two propulsion/lift modules, wherein a first one of the two propulsion/lift modules is connected to a first one of the two wing tips by a first servo motor and a second one of the two propulsion/lift modules is connected to a second one of the two wing tips by a second servo motor, and wherein each of the two propulsion/lift modules comprises:
a pivotal support structure configured to pivot around a longitudinal axis extending laterally across the monolithic wing;
two pylons extending radially outwardly from the pivotal support structure and at least partially away from one another; and
two propulsion units with one propulsion unit attached to a distal end of each pylon,
wherein when the aerial drone is in a vertical takeoff and landing (VTOL) flight mode, the two propulsion/lift modules are rotated with respect to the monolithic wing so that thrust from the two propulsion/lift modules is directed approximately perpendicular to a lifting surface of the monolithic wing.

2. The aerial drone of claim 1, wherein the two pylons extending radially outwardly from the pivotal support structure comprise two pylons extending obliquely outward from each wing tip.

3. The aerial drone of claim 1, wherein the two propulsion/lift modules are further configured to rotate with respect to the monolithic wing to enable the aerial drone to operate in a flat-spin flight mode and in a wing flight mode.

4. The aerial drone of claim 1, wherein the pivotal support structure includes a trailing edge, and wherein when the aerial drone is in the VTOL flight mode, the trailing edges of the pivotal support structure are positioned to provide a landing structure.

5. The aerial drone of claim 1, wherein during a transition to or from the VTOL flight mode, the two propulsion/lift modules rotate through approximately 90 degrees, and wherein the monolithic wing is configured so that rotors of the two propulsion units do not strike the monolithic wing.

6. The aerial drone of claim 3, wherein when the aerial drone is in the wing flight mode, the two propulsion/lift modules are rotated with respect to the monolithic wing so that thrust from the two propulsion/lift modules is directed approximately parallel to the lifting surface of the monolithic wing.

7. The aerial drone of claim 3, wherein when the aerial drone is in the flat-spin flight mode, the two propulsion/lift modules are rotated independently with respect to the monolithic wing into positions at which rotors generate yaw forces.

8. The aerial drone of claim 1, further comprising:
a processor, coupled to the first servo motor and the second servo motor, located in the monolithic wing.

9. The aerial drone of claim 1, further comprising an empennage connected to the monolithic wing.

10. The aerial drone of claim 1, wherein the monolithic wing is modular and replaceable with another monolithic wing having a different flight characteristic.

11. The aerial drone of claim 1, wherein the monolithic wing includes a cargo volume for holding a payload.

12. A propulsion/lift module, comprising:
a pivotal support structure coupled to a wing tip of a monolithic wing by a servo motor and configured to rotate relative to the monolithic wing;
two pylons extending radially from two surfaces of the pivotal support structure, wherein each of the two pylons project obliquely outward from the wing tip; and
two propulsion units, wherein one of the two propulsion units is mounted to a distal end of each pylon,
wherein in a vertical takeoff and landing (VTOL) flight mode, the propulsion/lift module is rotated with respect to the monolithic wing so that thrust from the propulsion/lift module is directed approximately perpendicular to a lifting surface of the monolithic wing.

13. The propulsion/lift module of claim 12, further comprising two rotors, wherein one rotor is coupled to each propulsion unit.

14. A method of operating an unmanned aerial vehicle (drone) comprising a monolithic wing having two wing tips and two propulsion/lift modules, wherein each of the two propulsion/lift modules comprises: a pivotal support structure configured to pivot around a longitudinal axis extending laterally across the monolithic wing, two pylons extending from the pivotal support structure and at least partially away from one another, and two propulsion units, wherein one propulsion unit is mounted to a distal end of each pylon, and wherein each pylon extends radially from a surface of the pivotal support structure and extends obliquely outward from each wing tip, the method comprising:
rotating each of the two propulsion/lift modules independently, wherein a first one of the two propulsion/lift modules is connected to a first one of the two wing tips by a first servo motor and a second one of the two propulsion/lift modules is connected to a second one of the two wing tips by a second servo motor, and wherein rotating each of the two propulsion/lift modules independently comprises rotating each pivotal support structure so that thrust from the two propulsion/lift modules is directed approximately perpendicular to a lifting surface of the monolithic wing to place the drone in a vertical takeoff and landing (VTOL) flight mode; and
controlling applied power independently to the propulsion units according to a flight mode.

15. The method of claim 14, wherein rotating each of the two propulsion/lift modules independently further comprises rotating the two propulsion/lift modules independently with respect to the monolithic wing to enable the drone to operate in a flat-spin flight mode and in a wing flight mode.

16. The method of claim 14, wherein rotating each of the two propulsion/lift modules independently further comprises transitioning to or from the VTOL flight mode to a wing flight mode by incrementally rotating each pivotal support structure through approximately 90 degrees.

17. The method of claim 15, wherein rotating each of the two propulsion/lift modules independently further comprises operating the drone in the wing flight mode by rotating each pivotal support structure so that thrust from the two propulsion/lift modules is directed approximately parallel to the lifting surface of the monolithic wing.

18. The method of claim 15, wherein rotating each of the two propulsion/lift modules independently further comprises putting the drone into the flat-spin flight mode by independently rotating the two propulsion/lift modules into positions at which rotors generate yaw forces.

19. The method of claim 14, wherein rotating each of the two propulsion/lift modules independently and controlling the applied power independently to the propulsion units according to a flight mode comprise controlling yaw, pitch, and roll of the drone by individually controlling a rotation angle of each of the two propulsion/lift modules, and individually controlling power applied to each of the propulsion units.

20. The method of claim 19, further comprising controlling yaw and pitch attitude by:

increasing power to the propulsion units located on a first one of the two wing tips for yaw control; and increasing power simultaneously to either the top or bottom propulsion units at the two wing tips for pitch control.

21. The method of claim 19, wherein rotating each of the two propulsion/lift module independently comprises controlling roll attitude by:

rotating the two propulsion/lift modules by equal but opposite angles above and below the lifting surface of the monolithic wing.

22. An aerial drone, comprising:

a monolithic wing having two wing tips;

two propulsion/lift modules, wherein one propulsion/lift module is connected to each wing tip of the monolithic wing by a servo motor, and wherein each propulsion/lift module comprises:

one pivotal support structure having two surfaces;

two pylons, wherein one pylon is coupled to each surface of the pivotal support structure;

two propulsion units, wherein one propulsion unit is mounted to a distal end of each pylon; and two rotors, wherein one rotor is coupled to each propulsion unit;

wherein each pylon extends radially from a surface of the pivotal support structure and extends obliquely outward from each wing tip;

means for orientating each propulsion/lift module independently, wherein when the aerial drone is in a vertical takeoff and landing (VTOL) flight mode, the two propulsion/lift modules are rotated with respect to the monolithic wing so that thrust from the two propulsion/lift modules is directed approximately perpendicular to a lifting surface of the monolithic wing; and means for controlling applied power independently to each rotor to achieve stable flight according to a flight mode.

23. The aerial drone of claim 1, wherein the first one of the two propulsion/lift modules and second one of the two propulsion/lift modules are detachably coupled to the first one of the two wing tips and the second one of the two wing tips, respectively.

24. The method of claim 18, wherein putting the drone into the flat-spin flight mode comprises independently rotating the two propulsion/lift modules to 360 degrees.

* * * * *